US007799398B2

(12) United States Patent
Nakamura et al.

(10) Patent No.: US 7,799,398 B2
(45) Date of Patent: Sep. 21, 2010

(54) DEVELOPING MEMBER AND ELECTROPHOTOGRAPHIC IMAGE FORMING APPARATUS

(75) Inventors: Minoru Nakamura, Suntoh-gun (JP); Arihiro Yamamoto, Mishima (JP); Masaki Yamada, Mishima (JP); Masahiro Kurachi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 11/850,853

(22) Filed: Sep. 6, 2007

(65) Prior Publication Data

US 2008/0081277 A1 Apr. 3, 2008

(30) Foreign Application Priority Data

Sep. 29, 2006 (JP) ............................ 2006-269657
Jul. 31, 2007 (JP) ............................ 2007-199230

(51) Int. Cl.
*B29D 22/00* (2006.01)

(52) U.S. Cl. .................. 428/35.8; 428/36.91; 428/447; 399/279; 399/333

(58) Field of Classification Search ................. 399/279, 399/333; 428/35.8, 36.91, 447
See application file for complete search history.

(56) References Cited

U.S. PATENT DOCUMENTS 5,482,775 A 1/1996 Miyabayashi ............... 428/391
6,300,382 B1 * 10/2001 Baba et al. .................... 521/54
6,360,069 B1 3/2002 Mimura et al.
6,471,628 B1 * 10/2002 Hirayama .................... 492/56
2002/0091170 A1 7/2002 Sakata et al. .................. 521/86
2003/0118372 A1 6/2003 Kitano et al.
2005/0078987 A1 4/2005 Nakamura et al. .......... 399/286
2007/0111872 A1 5/2007 Nakamura et al.

FOREIGN PATENT DOCUMENTS

EP 1 014 212 A1 6/2000
JP 11212354 8/1999
JP 2003167398 6/2003

OTHER PUBLICATIONS

European Search Report dated Dec. 30, 2009 issued in the counterpart Application No. 07116632.6.

* cited by examiner

*Primary Examiner*—Betelhem Shewareged
(74) *Attorney, Agent, or Firm*—Fitzpatrick, Cella, Harper & Scinto

(57) ABSTRACT

A developing member is provided which is capable of forming a high-quality image by simultaneously solving the problem of fogging in a high temperature and high humidity environment and the problem of ghosts in a low temperature and low humidity environment. The developing member includes a mandrel and a resin layer formed on the periphery of the mandrel, and has an outermost surface layer containing a non-reactive silicone compound. The non-reactive silicone compound satisfies the following requirements: (A) a copolymer of silicone and polyoxyethylene; (B) a specific gravity (25° C.) d of $0.99 \leqq d \leqq 1.03$; and (C) a solubility in water (25° C.) of less than 0.1% by mass.

7 Claims, 2 Drawing Sheets

DEVELOPING MEMBER AND ELECTROPHOTOGRAPHIC IMAGE FORMING APPARATUS

BACKGROUND OF THE INVENTION

1. Field of the Invention

The present invention relates to a developing member such as a developing roller used in an electrophotographic image forming apparatus such as a copying machine or a laser printer, and to an electrophotographic image forming apparatus using the developing member.

2. Description of the Related Art

Conventionally, a pressure-developing method has been known as one of the developing methods employed in electrophotographic apparatuses such as copying machines, printers, and facsimile receivers. The pressure-developing method uses a developer of a nonmagnetic toner component and attaches the developer to a latent image on a photosensitive drum to visualize the latent image.

The pressure-developing method has been used in a wide variety of applications because of its advantages such as: magnetic material is not required; the apparatus can be made simple or compact with ease; and a developer can be made up as a color toner with ease.

In an electrophotographic image forming apparatus employing the pressure-developing method, a rotating photosensitive drum is uniformly charged by a charging member and is then irradiated with laser light to form an electrostatic latent image. Subsequently, a developing device supplies a developer on the electrostatic latent image to obtain a toner image, followed by transferring the toner image from the photosensitive drum to a transfer material (recording material). Finally, the toner image on the transfer material is fixed thereon by heating or the like.

After transferring the toner image, the surface of the photosensitive drum is de-charged to clean off any remaining developer. Thus, it comes to be in a waiting state in which it is ready for new image formation.

The above developing device includes: a storage container for storing a developer; a developing member typified by a developing roller, which is arranged so as to be partly exposed with the opening of the container being closed; and a developer-supplying roller, which applies the developer on the surface of a developing roller.

The developing device may be further provided with a developing blade for uniformly forming a thin layer of the developer on the surface of the developing roller by the developer-supplying roller. The thin-film developer can be transferred to an exposure part of the developing roller as the developing roller rotates.

The thin-film developer is attached to an electrostatic latent image on a photosensitive drum, which is disposed opposite to the exposure part of the developing roller to visualize the electrostatic latent image, thereby forming a toner image on the photosensitive drum.

In many cases, for the surface of a developing roller used in such a developing device, a polyurethane resin is used for improving electrostatic properties of toner. However, the polyurethane resin shows a high water-absorbing property. Thus, in such a developing member, the amount of the electrostatic charge of the toner is decreased at high temperature and high humidity in some cases. To solve the above problem, Japanese Patent Application Laid-Open No. H11-212354 (U.S. Pat. No. 6,360,069) discloses a technology to inhibit the amount of the electrostatic charge of the toner from decreasing at high temperature and high humidity, specifically at a temperature of 35° C. and a humidity of 85% RH (relative humidity). That is, a constitution is proposed in which the principle component of the surface layer is a polyurethane resin obtained by reaction of a polyol compound with an isocyanate compound or with the isocyanate compound and a chain extender wherein either or both of the polyol and the chain extender include a polysiloxane skeleton.

Further, in Japanese Patent Application Laid-Open No. 2003-167398 (U.S. Patent Application Publication No. US-2003-0118372) proposes the use of a conductive member as an outermost resin layer, where the conductive member is made of a resin material that contains a urethane resin and a polysiloxane component. It is aimed at preventing the occurrence of fogging at the initial stage and after extensive operation while stably attaining the adhesion of a photosensitive to meet the needs of high image quality, speed-up, and high durability.

An idea of combining a urethane resin and polysiloxane as described above may be effective in realization of a charging member with high performance. However, as the need for a highly reliable developing roller is growing, it may become very difficult for image characteristics under opposite extreme environmental conditions such as a high temperature and high humidity (30° C./85% RH) environment and a low temperature and low humidity (15° C./10% RH) environment to be consistent with each other. Specifically, in a high temperature and high humidity environment, fogging may occur due to remarkable deterioration in frictional chargeability for the developer. In order to solve such a problem, if frictional chargeability is enhanced, the effect of suppressing fogging is obtained. In this case, however, when the developing roller is used in a low temperature and low humidity environment, ghosts may noticeably occur due to the charge-up of the developer ascribable to high frictional chargeability. Since this relation is a reverse correlation, a developing member having more stable chargeability in both a high temperature and high humidity environment and a low temperature and low humidity environment has been hardly realized.

SUMMARY OF THE INVENTION

Therefore, an object of the present invention is to provide a developing member having high reliability, which can simultaneously inhibit the occurrence of fogging in a high temperature and high humidity environment and the occurrence of ghosts in a low temperature and low humidity environment. Another object of the present invention is to provide an electrophotographic image forming apparatus using the developing member.

A developing member according to the present invention includes a mandrel and a resin layer formed on the periphery of the mandrel, and has an outermost surface layer containing a non-reactive silicone compound, in which the non-reactive silicone compound satisfies the following requirements (A) to (C): (A) a copolymer of silicone and polyoxyethylene; (B) a specific gravity (25° C.) d of $0.99 \leqq d \leqq 1.03$; and (C) a solubility in water (25° C.) of less than 0.1% by mass.

For attaining the above objects, the inventors of the present invention have conducted intensive research. In particular, the inventors of the present invention have focused attention on enhancement of frictional chargeability of a developing member for toner in order to solve the problem of fogging in a high temperature and high humidity environment. In addition, in order to solve the problem of ghosts in a low temperature and low humidity environment, the inventors of the present invention have focused attention on influences of the surface-boundary state of a developing member and water.

An ether group has high frictional chargeability for toner because of its concentrated electron cloud in the highest occupancy molecular orbital with an electron-releasing property. Therefore, the inventors of the present invention have focused attention on a copolymer of polyoxyethylene and silicone, which has a relatively higher ether group concentration among polyethers, and have studied fogging in a high temperature and high humidity environment. As a result, the molecular weight of the polyoxyethylene moiety is too large and the copolymer having a specific gravity (25° C.) d of more than 1.03 shows strong hydrophilicity, and may come to be a leak point of frictional charges of toner. Therefore, fogging in a high temperature and high humidity environment is not sufficiently prevented in some cases. On the other hand, when the specific gravity (25° C.) d is less than 0.99, the molecular weight of the polyoxyethylene moiety becomes relatively small. Thus, sufficient frictional chargeability cannot be obtained, thus fogging is liable to occur.

The inventors of the present invention have built up studies of copolymers of silicone and polyoxyethylene with a specific gravity (25° C.) d of $0.99 \leqq d \leqq 1.03$, which provide toner with good chargeability in a high temperature and high humidity environment. However, some of them exhibited the insufficient effects of inhibiting the occurrence of ghosts in a low temperature and low humidity environment. Thus, the inventors of the present invention have found that copolymers having solubility of less than 0.1% by mass in water (25° C.) are unlikely to generate ghost in a low temperature and low humidity environment. The detailed mechanism of the above is unknown. However, it is conceivable that the effect of water slightly present even in a low humidity environment on the surface boundary of the surface layer containing such a copolymer is reduced, toner with charge-up is not generated, and the problem of ghosts is solved, because the copolymer has extremely low affinity with water.

In addition, copolymers of silicone and polyoxyethylene with a solubility of 0.1% by mass or more in water (25° C.), i.e., those having the function of a surfactant are liable to generate ghosts in a low temperature and low humidity environment, and to generate fogging in a high temperature and high humidity environment. The amphipathic property of the copolymers having the function of a surfactant makes it difficult to change the surface characteristics of the developing roller, and it is considered that the generation of leak points of frictional charges cannot be prevented in a high temperature and high humidity environment and the influence of a slight amount of water on the surface boundary of the developing roller cannot be prevented in a low temperature and low humidity environment. Therefore, the present invention has been completed on the basis of these various findings the inventors of the present invention have acquired.

An electrophotographic image forming apparatus according to the present invention includes: an image carrier for carrying an electrostatic latent image; a charging device for primary charging the image carrier; an exposure device for forming an electrostatic latent image on the primarily charged image carrier; a development device for developing the electrostatic latent image to form a toner image; and a transfer device for transferring the toner image to a transfer material, in which the development device includes the developing member.

Further features of the present invention will become apparent from the following description of exemplary embodiments with reference to the attached drawings.

DESCRIPTION OF THE EMBODIMENTS

Hereinafter, the present invention will be further described in detail.

(Developing Roller)

Figure 1:
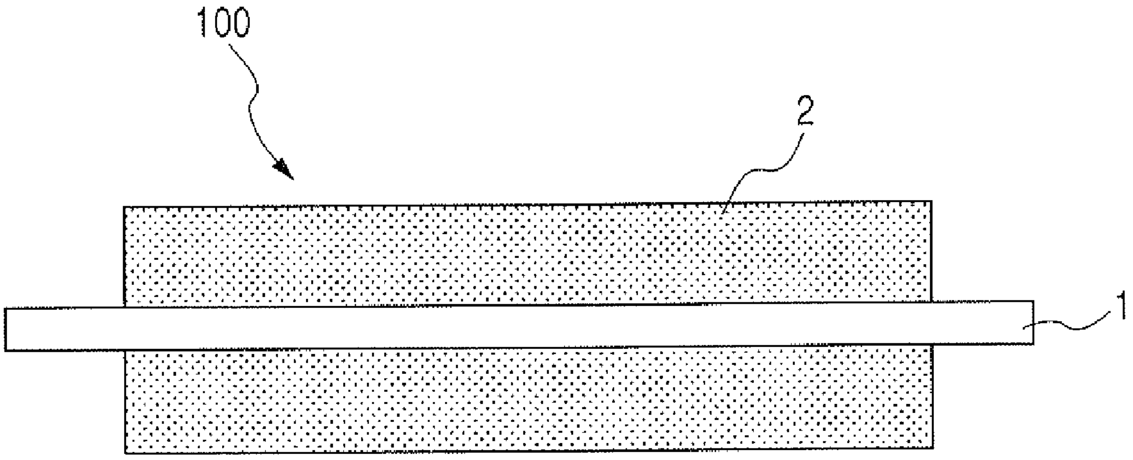
FIG. 1 is a cross sectional view in the axial direction of a developing roller according to an embodiment of the present invention.

FIG. 1 is a schematic cross sectional view of a developing roller as an embodiment of the developing member of the present invention.

A developing roller 100 shown in FIG. 1 has a resin layer 2 on the periphery of a mandrel (shaft) 1 with a good conductive property. The resin layer 2 contains a non-reactive silicone compound. In addition, the non-reactive silicone compound satisfies the following requirements (A) to (C): (A) a copolymer of silicone and polyoxyethylene; (B) a specific gravity (25° C.) d of $0.99 \leqq d \leqq 1.03$; and (C) a solubility in water (25° C.) of less than 0.1% by mass.

The resin layer 2 is preferably a non-foamed solid layer. This is because a foamed shape does not appear on an image and it in not necessary to take into account a decrease in strength of the resin layer 2.

Since the resin layer 2 contains the non-reactive silicone compound that satisfy the above requirements (A) to (C), frictional chargeability for a developer, the surface-boundary state of the developing roller, and an influence of water can be controlled. As a result, both the occurrence of fogging in a high temperature and high humidity environment and the occurrence of ghosts in a low temperature and low humidity environment can be simultaneously inhibited.

It is preferable that the non-reactive silicone compound has no cloud point. When having no cloud point, it does not have the function of a surfactant. Thus, any trouble due to the above amphipathic property can be prevented.

The non-reactive silicone compound does not have hydrogen to react with an isocyanate group, such as active hydrogen (hydrogen of a hydroxyl group or hydrogen of an amino group); an reactive double bond such as a vinyl group; an epoxy group; and a carboxyl group. The presence of a reactive functional group may cause a large decrease in molecular mobility because the non-reactive silicone compound is chemically incorporated as a part of a substrate (resin). Therefore, it is difficult to exert the effects of the present invention in a specific manner.

The form of copolymerization between a silicone moiety and a polyoxyethylene moiety of the compound may be of a straight-chain block polymer type, a branched block polymer type, or a graft polymer type with a silicone moiety and a polyoxyethylene moiety. The specific structures may be described as general formulae (A) to (D) as follows:

(A)

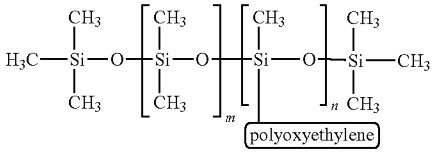

(B)

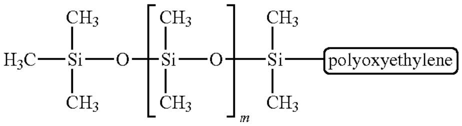

(C)

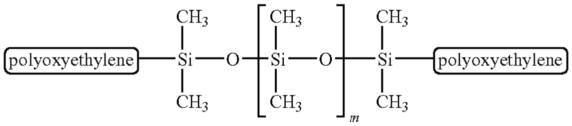

(D)

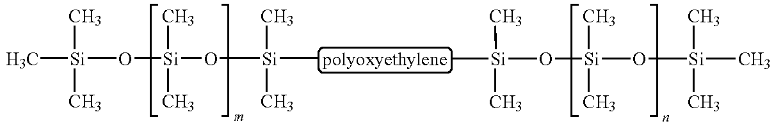

where m and n are each independently a positive integer.

Further, the structure of the non-reactive silicone compound which can more effectively exert the effects of the present invention is one represented by the following structural formula (1):

(1)

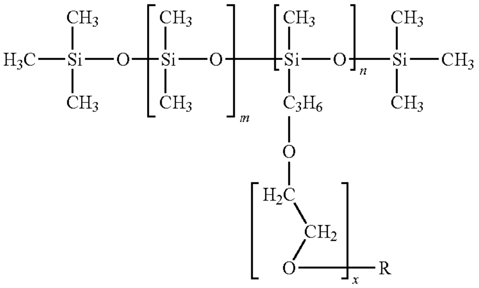

where m, n, and x are each independently an integer of 1 or more, and R represents an alkyl group.

Further, the above non-reactive silicone compound may preferably have a weight-average molecular weight (Mw) of $6{,}000 \leqq Mw \leqq 11{,}000$. As far as the weight-average molecular weight of the non-reactive silicone compound is in the above range, the non-reactive silicone compound is more apt to exist on the surface of the developing roller, thereby more easily exerting the effects of the present invention.

The requirements (B) and (C) can be satisfied by suitably adjusting a component weight ratio of the silicone moiety to the polyoxyethylene moiety of the non-reactive silicone compound (silicone moiety/polyoxyethylene moiety) in the range of from 95/5 to 70/30.

It is preferable that the above non-reactive silicone compound is added to a resin (substrate) that forms an outermost surface layer in the amount of 0.1 to 20 parts by mass with respect to 100 parts by mass of the resin, whereby it is possible to adequately control frictional chargeability for a developer, the surface-boundary state of the developing roller, and an influence of water, thus the effects of the present invention can be enhanced. It is more preferable that the non-reactive silicone compound is added in the amount of 0.5 parts by mass to 10 parts by mass.

The molecular structure of the non-reactive silicone compound and the structures of the silicone and polyoxyethylene moieties can be identified by isolating the non-reactive silicone compound from the surface layer with an appropriate means and subjecting the isolated compound to any conventional procedure such as pyrolysis GC/MS, NMR, IR, or an elemental analysis. In addition, the addition amount of the compound can be determined with reference to a quantitative ratio when it is extracted from the surface layer.

In the present invention, the specific gravity (25° C.) of the non-reactive silicone compound may be determined using a measuring device that employs an oscillating density meter method defined by JIS K 0061 (method of determining density and specific gravity of chemical product). Specifically, the measurement may be carried out using a density specific gravity meter (trade name: DA-520, manufactured by Kyoto Electronics Manufacturing Co., Ltd.).

In the present invention, a method of determining the solubility of the compound in water (25° C.) is carried out as follows: a 0.1 mass % aqueous solution of the above non-reactive silicone compound is prepared (e.g., 100 g of distilled water (25° C.) and 0.1 g of the non-reactive silicone compound are weighed and mixed together in a glass beaker); and the water solubility (25° C.) of the non-reactive silicone compound is defined as 0.1% by mass or more when the non-reactive silicone compound can be completely dissolved to make a clear aqueous solution by stirring the aqueous solution with a magnetic stirrer for 24 hours. On the other hand, the solubility of the compound is defined as less than 0.1% by mass when an insoluble matter remains or becomes a cloudy suspension.

In the present invention, the measurement of a cloud point is carried out as follows: a 1.0 mass % aqueous solution of the above non-reactive silicone compound is prepared (e.g., 100 g of distilled water and 1.0 g of the non-reactive silicone compound are weighed and mixed together in a test tube); and the aqueous solution is warmed in hot water and a temperature at which the clear solution becomes cloudy is defined as a cloud point. If the solution does not become clear and remains cloudy even after cooling to a temperature of 10° C., the solution is defined as one having no cloud point.

In the present invention, the measurement of a weight-average molecular weight is carried out using a method of using molecular weight distribution by gel permeation chromatography (GPC).

The weight-average molecular weight (Mw) in a chromatogram by GPC may be measured under the following conditions: a column is stabilized in a heat chamber at 40° C.; toluene as a solvent is flown into the column at a flow rate of 1 ml/min; and about 100 μl of a toluene sample solution in which the non-reactive silicone compound is adjusted to be in 0.3% by mass as a sample concentration, is injected into the column. For determining the molecular weight of the sample, the molecular weight distribution in the sample is calculated from the relationship between logarithmic values of analytical curves of several mono-dispersed polystyrene standard samples and counted values (retention times). For making the analytical curves, at least 10 different standard polystyrene samples are preferably used. Specifically, for example, those having molecular weights of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$ are used. For example, the standard polystyrene samples may be those commercially available from Tosoh Corporation or Pressure Chemicals Ltd. In addition, as a detector, a refractive index detector may be used.

As the columns, a combination of commercially available polystyrene-gel columns may preferably be used, which are in the market. The following may be cited: for example, a combination of Shodex GPC KF-801, 802, 803, 804, 805, 806, and 807, which are manufactured by Showa Denko Co., Ltd.; and a combination of μ-styragel 500, 103, 104, and 105, which are manufactured by Waters Co., Ltd.

(Mandrel)

The shaft 1 provided as a mandrel may be any material inasmuch as it has good electric conductivity. Usually, a metal cylindrical tube of 4 to 10 mm in outside diameter, which is made of aluminum, iron, or SUS, is used.

Examples of a base material of the resin layer 2 formed on the periphery of the shaft 1 include a polyamide resin, an urethane resin, an urea resin, an imide resin, a melamine resin, a fluorine resin, a phenol resin, an alkyd resin, a polyester resin, a polyether resin, an acryl resin, a natural rubber, a butyl rubber, an acrylonitrile-butadiene rubber, a polyisoprene rubber, a polybutadiene rubber, a silicone rubber, a styrene-butadiene rubber, an ethylene-propylene rubber, an ethylene-propylene-diene rubber, a chloroprene rubber, and mixtures thereof.

Among them, the urethane resin is preferably used as the base material of the resin layer 2 because it has a higher ability of charging the developer by friction and shows abrasion resistance. Specifically, raw materials of the urethane resin include polyols and isocyanates, and if required, a chain extender. The polyols to be used as raw materials of the urethane resin include polyether polyol, polyester polyol, polycarbonate polyol, polyolefin polyol, acrylic polyol, and mixtures thereof. The isocyanates to be used as raw materials of the urethane resin include tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethyl xylylene diisocyanate (TMXDI), cyclohexane diisocyanate, and mixtures thereof. The chain extenders to be used as raw materials of the urethane resin include: bifunctional low-molecular diols such as ethylene glycol, 1,4-butanediol, and 3-methylpenthane diol; trifunctional low-molecular triols such as trimethylol propane; and mixtures thereof.

Among the urethane resins, in particular, a polyether polyurethane resin using polyether polyol is preferably employed. In this case, the affinity of the resin material with the polyoxyethylene moiety of the non-reactive silicone compound prevents the above non-reactive silicone compound from oozing out of the resin to move to another member, while characteristically reducing the occurrence of ghosts in a low temperature and low humidity environment.

The resin layer 2 is formed from a material with an appropriate resistivity range (volume resistivity) of preferably $10^3$ Ω·cm to $10^{11}$ Ω·cm by mixing the base material with a conductivity-imparting agent such as an electronically conductive substance or an ionic-conductive substance. The volume resistivity of the resin layer 2 is more preferably in the range of $10^4$ Ω·cm to $10^{10}$ Ω·cm. In addition, the thickness of the resin layer 2 is preferably in the range of 0.3 mm to 10.0 mm, more preferably in the range of 1.0 mm to 5.0 mm.

Examples of the electronically conductive substance which provides the resin layer 2 with conductivity, include: conductive carbons such as Ketjen Black EC (manufactured by LION Corporation) and acetylene black; carbons for rubber such as SAF, ISAF, HAF, FEF, GPF, SRF, FT, and MT; carbon for color (ink) subjected to oxidation treatment; metals such as copper, silver, and germanium; and metal oxides. Among them, the carbon blacks (conductive carbon, carbon for rubber and carbon for color (ink)) are preferable, because the conductivity can easily be controlled in a small amount.

Examples of the ionic conductive substance which imparts conductivity to the resin layer 2, include: inorganic ionic conductive substances such as sodium perchlorate, lithium perchlorate, calcium perchlorate, and lithium chloride; and organic ionic conductive substances such as denatured aliphatic dimethyl ammonium ethosulfate and stearyl ammonium acetate.

These conductivity-imparting agents are used in amounts required for providing the resin layer with appropriate volume resistivity as described above. In general, it is preferably used in the range of 1 part by mass to 50 parts by mass with respect to 100 parts by mass of the substrate.

When the resin layer 2 is formed from a polyether urethane resin, preferably, the relationship between the weight-average molecular weight (Mw) of the above non-reactive silicone compound and the weight-average molecular weight (N) of the polyetherpolyol as the raw material of the above polyether polyurethane satisfies $Mw<N$. By designing the relation of Mw and N so as to satisfy $Mw<N$, the molecular interaction between the polyether chain of the polyether polyurethane and the polyoxyethylene moiety of the non-reactive silicone compound becomes significantly strong. Therefore, the non-reactive silicone compound can be strongly retained on the surface urethane resin layer while keeping its molecular mobility. Thus, both the occurrence of fogging in a high temperature and high humidity environment and the occurrence of ghosts in a low temperature and low humidity environment can be prevented significantly.

Figure 2:
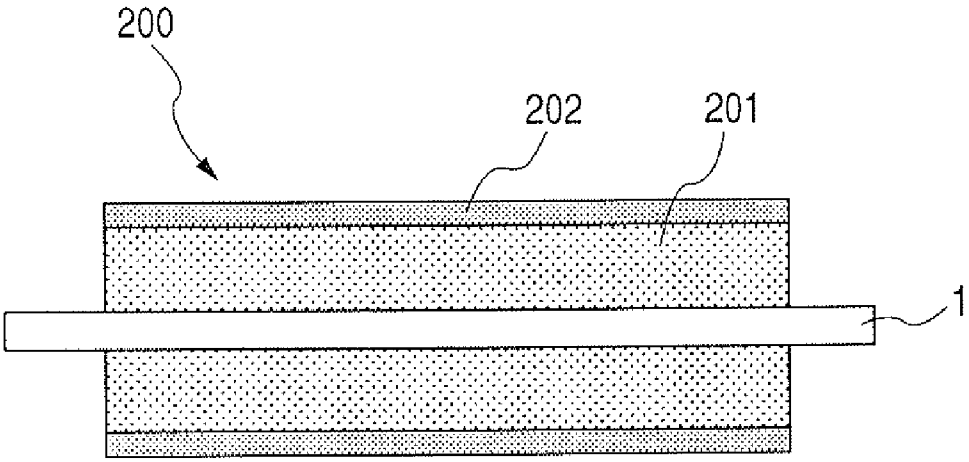
FIG. 2 is a cross sectional view in the axial direction of a developing roller according to another embodiment of the present invention.

FIG. 2 is a schematic cross sectional view of a developing roller as another embodiment of the present invention. In FIG. 2, a developing roller 200 is composed of a mandrel 1 and two resin layers covering the periphery of the mandrel 1. The two resin layer are composed of a resin layer 201 formed on the surface of the mandrel 1 and a resin layer 202 formed as a surface layer of a developing roller on the surface of the resin layer 201.

The resin layer 202 corresponds to the resin layer 2 of the developing roller 100 as shown in FIG. 1. Thus, the description concerning the resin layer 2 is applied also to the resin layer 202.

A resin employed in the resin layer 201 is preferably one which is superior in elasticity so that the resin layer 201 constituting a lower layer can ensure a stable nip width with a drum to keep the uniformity of images and to continue to constantly output images for a long period of time. Preferred examples of such a resin include a natural rubber, a butyl rubber, an acrylonitrile-butadiene rubber, a polyisoprene rubber, a polybutadiene rubber, a silicone rubber, a styrene-butadiene rubber, an ethylene-propylene rubber, an ethylene-propylene-diene rubber, a chloroprene-rubber, and mixtures thereof. Among them, the silicone rubber and the ethylene-propylene-diene rubber are particularly preferable.

In addition, it is preferable that the resin layer 201 is incorporated with a conductive substance so as to adjust its resistivity range (volume resistivity) to a suitable range. That is, the volume resistivity of the resin is preferably $10^3$ Ω·cm to $10^{10}$ Ω·cm, more preferably $10^4$ Ω·cm to $10^8$ Ω·cm.

The above conductive substance may be the same as added to the above resin layer 2. Also, the addition amount of the conductive substance may be the same as in the above resin layer 2.

Further, the resin layer 201 may have an ASKER-C hardness of 25° to 70°, preferably 35° to 50°.

Moreover, in general, the resin layer 201 has preferably a thickness of 0.3 mm to 10 mm, more preferably a thickness of 1.0 mm to 5.0 mm. On the other hand, in order to prevent the elasticity of the lower resin layer from being lost, the resin layer 202 preferably has a thickness of 0.5 μm to 100 μm.

The developing roller with the resin layer formed thereon is cut into 9 pieces and cross sections thereof are measured by a slide gauge and the average thereof is defined as the thickness of each resin layer. If the thickness of the resin layer is small (1.0 mm or less), nine cross sections are measured using a video microscope (5 to 3,000 magnifications) and the average value thereof is defined as the thickness of each resin layer.

The developing rollers formed in accordance with the present invention as described in FIG. 1 and FIG. 2 can be produced as follows.

The developing roller shown in FIG. 1 can be produced by injecting a composition prepared by kneading the above resin (substrate), the conductivity-imparting agent, and the non-reactive silicone compound to be added when at least the outermost surface layer is formed, into the cavity of a molding die in which the mandrel is previously set. Also, a predetermined tubular structure with predetermined dimensions is cut out of a slab or a block having been separately formed from the above composition. The mandrel is then pressed into the tubular structure to form a resin layer as the outermost surface layer on the mandrel, thereby forming a developing roller. If desired, the resulting developing roller may be further subjected to cutting or polishing and adjusted to a predetermined outside diameter.

The developing roller shown in FIG. 2 can be produced by applying the above composition on the peripheral surface of the resin layer 201 previously formed on the periphery of the mandrel on the resin layer 202 by a spraying or dipping method and timely heat hardening the applied layer.

The resin layer 201 can be formed by the following method (1) or (2): (1) A method including the step of injecting the above composition to form the resin layer into the cavity of a molding die in which the mandrel is previously set, followed by heat hardening; and (2) A method including the steps of forming a slab or a block from the composition for forming the resin layer in advance, cutting a predetermined tubular structure with predetermined dimensions out of the slab or the block, and pressing the mandrel into the tubular structure.

In both the methods (1) and (2), after the resin layer 201 is formed on the periphery of the mandrel, if required, it may be further subjected to cutting or polishing and adjusted to a predetermined outside diameter.

In the formation of the resin layer 202, the above resin (substrate), the conductivity-imparting agent and the non-reactive silicone compound to be added when at least the outermost surface layer is formed, are kneaded. The kneading may be carried out using an equipment such as a mill ball and, if required, roughening particles for adjusting the surface roughness of the developing roller are added and dispersed, followed by adding a hardening agent or a hardening catalyst to the mixture and stirring. The composition thus obtained may be applied using a coating method such as a spray or dipping method. Examples of the roughening particles to be added include: rubber particles such as EPDM, NBR, SBR, CR, and silicone rubber particles; elastomer particles such as polystyrene, polyolefin, polyvinyl chloride, polyurethane, polyester, and polyamide-based thermoplastic elastomer (TPE); and resin particles such as PMMA, an urethane resin, a fluorine resin, a silicone resin, a phenol resin, a naphthalene resin, a fran resin, a xylene resin, a divinylbenzene polymer, a styrene-divinylbenzene copolymer, and a polyacrylonitrile resin. These types of particles may be used singly or in a combination of two or more types In this case, the surface roughness Rz of the developing roller is generally adjusted to 1 μm to 15 μm. The surface roughness of the developing roller is defined as Rz according to JIS B0601: 2001.

(Electrophotographic Image Forming Apparatus)

An electrophotographic image forming apparatus according to the present invention includes the following structural elements: (1) An image carrier for carrying an electrostatic latent image. (2) A charging device for primarily charging the image carrier. (3) An exposure device for forming an electrostatic latent image on the primarily charged image carrier. (4) A development device for developing the electrostatic latent image by a developer to form a toner image. (5) A transfer device for transferring the toner image to a transfer material.

Subsequently, the development device of the above (4) includes the developing member according to the present invention.

Figure 3:
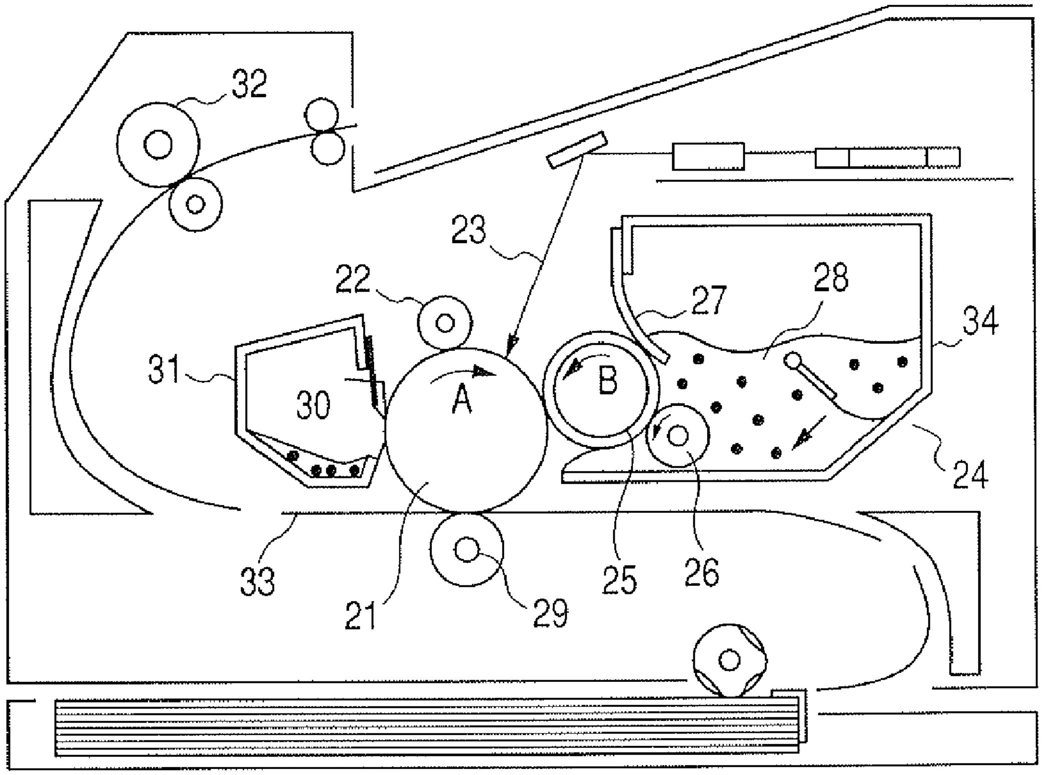
FIG. 3 is a cross sectional view of an electrophotographic apparatus using the developing device of the present invention.

FIG. 3 shows a schematic cross sectional view of the electrophotographic image forming apparatus of the present invention.

A photosensitive drum 21 as an image carrier rotates in the direction of arrow A and is then uniformly charged by a charging member 22 for charging the photosensitive drum 21. Subsequently, an electrostatic latent image is formed on the surface of the photosensitive drum 21 by laser light 23, which is an exposure means for forming the electrostatic latent image on the photosensitive drum 21. The developer is applied by development device 24 retained on a process cartridge, which can be detachably mounted on the body of the image forming apparatus. Consequently, the electrostatic latent image is developed and visualized as a toner image.

For the development, a reversal-development process of forming a toner image on an exposure part is carried out. The toner image on the photosensitive drum 21 is transferred to a sheet of paper 33 as a transfer material by a transfer roller 29 as a transfer member. The paper 33 with the toner image transferred thereon is then subjected to a fixing process by a fixing device 32, followed by discharging the sheet out of the apparatus. Consequently, the printing operation is terminated.

On the other hand, the developer remaining after the transfer, which has not been transferred and remains on the photosensitive drum 21, is scraped away by a cleaning blade 30 as a cleaning member for cleaning off the surface of the photosensitive drum, and stored in a waste developer container 31. The cleaned photosensitive drum 21 is used in an image-forming process in which the above operations are repeated.

The development device 24 is provided with a developing container 34 in which a non-magnetic developer 28 is stored as a one-component developer; and a developing roller 25 as a developer carrier, which is placed on an opening part extending in the longitudinal direction of the developing container 34 and facing to the photosensitive drum 21. The development device 24 is designed to develop and visualize the electrostatic latent image on the photosensitive drum 21. In addition, an electrophotographic process cartridge has a development device and at least one of an image carrier, a charging member, a cleaning member and a transfer member, which are integrally held and detachably mounted on the image forming apparatus.

In addition, the developing roller 25 is in contact with the photosensitive drum 21 with an abutment width. In the development device 24, a developer-supplying roller 26 is brought into contact with the developing roller 25 on the upstream side in the rotational direction of the developing roller 25 in a developing container 34 with respect to the contact portion where a developing blade 27 as a developer-regulating member comes in contact with the surface of the developing roller 25. In addition, the developer-supplying roller 26 is supported so as to be rotatable.

According to the present invention, it is possible to attain at an extremely high level the inhibition of the occurrence of both fogging on an electrophotographic image in a high temperature and high humidity environment and ghosts on an electrophotographic image in a low temperature and low humidity environment.

EXAMPLES

Hereinafter, the present invention will be described in detail by way of Examples and Comparative Examples. However, the examples do not restrict the present invention in any way.

(Non-Reactive Silicone Compound)

As non-reactive silicone compounds, the following non-reactive silicone compounds of Nos. 1 to 9 were prepared:

No. 1: A non-reactive silicone compound having a weight-average molecular weight Mw of 11,000, a specific gravity (25° C.) d of 1.02 (trade name: TSF4446, manufactured by GE Toshiba Silicone Co., Ltd.) was used. It had solubility in water (25° C.) of less than 0.1% by mass and no cloud point.

No. 2: A non-reactive silicone compound having a weight-average molecular weight Mw of 9,200, a specific gravity (25° C.) d of 1.03 (trade name: TSF4445, manufactured by GE Toshiba Silicone Co., Ltd.) was used It had solubility in water (25° C.) of less than 0.1% by mass and no cloud point.

No. 3: First, 0.022 mol of concentrated sulfuric acid was added to 2 ml of an aqueous solution containing 0.014 mol of chromium oxide (VI), while being cooled on ice, followed by adding 4 ml of water, thereby preparing a Jones reagent.

Subsequently, the Jones reagent was allowed to react with 10 g of polyethylene glycol monomethylether (manufactured by Aldrich Co., Ltd., Mn=550) for 24 hours at 20° C., thereby obtaining a raw material of a polyether moiety. Then, 5.0 g of the raw material was allowed to react with 0.014 mol of oxalyl dichloride (manufactured by Aldrich Co., Ltd.) in benzene for 5 hours at 40° C., thereby obtaining an acid chloride.

The resulting acid chloride (2.5 g) was allowed to react with 16 g of a polysiloxane compound (trade name: X22-170BX, manufactured by Shin-Etsu Chemical Co., Ltd.) in the presence of a small amount of pyridine in diethyl ether for 24 hours at room temperature. Consequently, a non-reactive silicone compound (No. 3) having a weight-average molecular weight Mw of 3,850 was obtained.

The resulting non-reactive silicone compound had a specific gravity (25° C.) d of 1.03, solubility in water (25° C.) of less than 0.1% by mass and no cloud point.

No. 4: The above Jones reagent was allowed to react with 10 g of polyethylene glycol monomethyl ether (manufactured by Aldrich Co., Ltd., Mn=750) in acetone at 20° C. for 24 hours, thereby obtaining a raw material of the polyether moiety. Then, 5.0 g of the raw material was allowed to react with 0.010 mol of oxalyl dichloride (manufactured by Aldrich Co., Ltd.) in benzene for 5 hours at 40° C., thereby obtaining an acid chloride. Subsequently, 2.5 g of the resulting acid chloride was allowed to react with 6.6 g of a polysiloxane compound (trade name: KF 6002, manufactured by Shin-Etsu Chemical Co., Ltd.) in diethyl ether in the presence of a small amount of pyridine for 24 hours at room temperature. Consequently, a non-reactive silicone compound (No. 4) having a weight average molecular weight Mw of 7,000 was obtained.

The resulting non-reactive silicone compound had a specific gravity (25° C.) d of 1.01, solubility in water (25° C.) of less than 0.1% by mass and no cloud point.

No. 5: The above Jones reagent was allowed to react with 10 g of polyethylene glycol monomethyl ether (manufactured by Aldrich Co., Ltd., Mn=550) in acetone at 20° C. for 24 hours, thereby obtaining a raw material of the polyether moiety. Then, 5.0 g of the raw material was allowed to react with 0.014 mol of oxalyl dichloride (manufactured by Aldrich Co., Ltd.) in benzene for 5 hours at 40° C., thereby obtaining an acid chloride. Subsequently, 2.5 g of the resulting acid chloride was allowed to react with 27.5 g of a polysiloxane compound (trade name: X22-170DX, manufactured by Shin-Etsu Chemical Co., Ltd.) in the presence of a small amount of pyridine in diethyl ether for 24 hours at room temperature. Consequently, a non-reactive silicone compound (No. 5) having a weight-average molecular weight Mw of 6,000 was obtained.

The resulting non-reactive silicone compound had a specific gravity (25° C.) d of 0.99, solubility in water (25° C.) of less than 0.1% by mass and no cloud point.

No. 6: The above Jones reagent was allowed to react with 10 g of polyethylene glycol (manufactured by Aldrich Co., Ltd., Mn=1,000) in acetone at 20° C. for 24 hours, thereby obtaining a raw material of the polyether moiety. Then, 5.0 g of the raw material was allowed to react with 0.014 mol of oxalyl dichloride (manufactured by Aldrich Co., Ltd.) in benzene for 5 hours at 40° C., thereby obtaining an acid chloride. Subsequently, 2.5 g of the resulting acid chloride was allowed to react with 41.2 g of a polysiloxane compound (trade name: X22-170DX, manufactured by Shin-Etsu Chemical Co., Ltd.) in the presence of a small amount of pyridine in diethyl ether for 24 hours at room temperature. Consequently, a non-reactive silicone compound (No. 6) having a weight average molecular weight Mw of 12,000 was obtained.

The resulting non-reactive silicone compound had a specific gravity (25° C.) d of 1.00, solubility in water (25° C.) of less than 0.1% by mass and no cloud point.

No. 7: A non-reactive silicone compound having a weight-average molecular weight Mw of 3,000 and a specific gravity (25° C.) d of 1.05 (trade name: SILWET L8600, manufactured by GE Toshiba Silicone Co., Ltd.) was used. The non-reactive silicone compound had solubility in water (25° C.) of 0.1% by mass or more and a cloud point of 76° C.

No. 8: A non-reactive silicone compound having a weight average molecular weight Mw of 3,200 and a specific gravity (25° C.) d of 0.96 (trade name: TSF451-50, manufactured by GE Toshiba Silicone Co., Ltd.) was used. The non-reactive silicone compound had a solubility in water (25° C.) of less than 0.1% by mass and no cloud point.

No. 9: The above Jones reagent was allowed to react with 10 g of diethylene glycol monoethyl ether (manufactured by Aldrich Co., Ltd.) in acetone at 20° C. for 24 hours, thereby obtaining a raw material of the polyether moiety. Then, 5.0 g of the raw material was allowed to react with 0.052 mol of oxalyl dichloride (manufactured by Aldrich Co., Ltd.) in benzene for 5 hours at 40° C., thereby obtaining an acid chloride. Subsequently, 2.5 g of the resulting acid chloride was allowed to react with 123 g of a polysiloxane compound (trade name: X22-170DX, manufactured by Shin-Etsu Chemical Co., Ltd.) in the presence of a small amount of pyridine in diethyl ether for 24 hours at room temperature. Consequently, a non-reactive silicone compound (No. 9) having a weight average molecular weight Mw of 5,700 was obtained.

The resulting non-reactive silicone compound had a specific gravity (25° C.) d of 0.98, solubility in water (25° C.) was less than 0.1% by mass and no cloud point.

The basic structures of the non-reactive silicone compounds of No. 1 to No. 9 as described above are shown below. In each structural formula, m, n and x are each independently an integer of 1 or more. In addition, R, R1 and R2 each independently represent an alkyl group.

No. 1

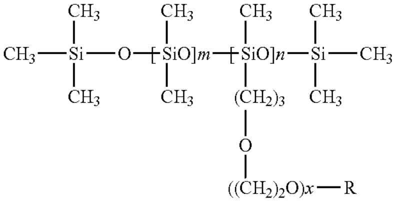

(In the above structural formula, m, n and x are each independently an integer of 1 or more, and R represents an alkyl group).

No. 2

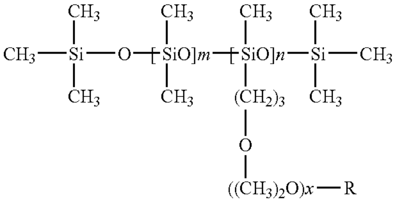

(In the above structural formula, m, n and x are each independently an integer of 1 or more, and R represents an alkyl group).

No. 3

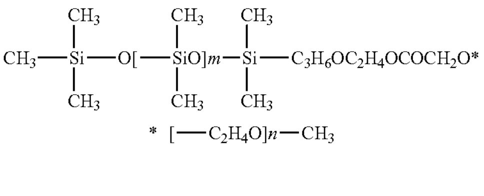

-continued

No.4

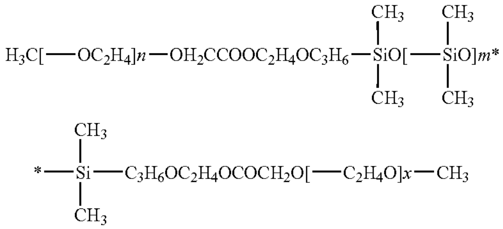

No. 5

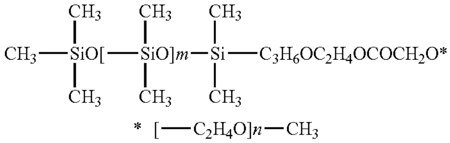

No. 6

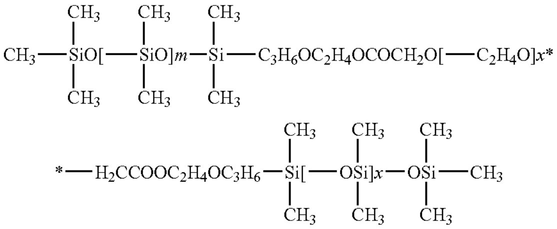

No. 7

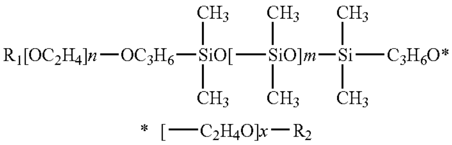

No. 8

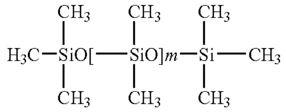

No. 9

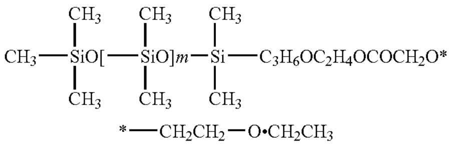

(Manufacture of Developing Roller)

Example 1

A core bar (mandrel) with an outside diameter of 8 mm was installed in a cylindrical die with an inside diameter of 16 mm so as to be concentrically arranged with the die. Subsequently, a liquid conductive silicone rubber (manufactured by Dow Corning Toray Silicone Co., Ltd., an ASKER-C hardness of 40°, and a volume resistivity of $1\times10^7$ Ω·cm) was injected as a material for forming an elastic layer into the cylindrical die. After that, it was placed in an oven at 130° C. and then heated and molded for 20 minutes. After removing the molded product from the die, secondary vulcanization was carried out in an oven at 200° C. for 4 hours, thereby forming an elastic layer with a thickness of 4 mm on the periphery of the core bar.

Next, the following materials were mixed stepwise in a methyl ethyl ketone solvent and allowed to react with each other at 80° C. for 3 hours under a nitrogen atmosphere. Consequently, a polyether polyol prepolymer (1) with a weight-average molecular weight Mw of 12,000 and a hydroxyl value of 17.2 was obtained.

Polytetramethylene glycol (trade name: PTG1000SN, manufactured by Hodogaya Chemical Co., Ltd.): 100 parts by mass Isocyante (trade name: Millionate MT, manufactured by Nippon Polyurethane Industry Co., Ltd.): 18.7 parts by mass Next, the following raw materials were mixed and methyl ethyl ketone was then added so as to be in a solid content of 28% by mass. The resulting product was used as a raw material liquid for the formation of a resin layer.

The above polyether polyol prepolymer (1): 100 parts by mass

Isocyante (trade name: C2521, manufactured by Nippon Polyurethane Industry Co., Ltd.): 85 parts by mass The above non-reactive silicone compound No. 1:1 parts by mass To the solid content of the raw material liquid, 20 parts by mass of carbon black (trade name: KA100, manufactured by Mitsubishi Chemical Corporation) and 30 parts by mass of acrylic resin particles (trade name: MX-1000, manufactured by Soken Chemical & Engineering Co., Ltd.) were added, and stirred and dispersed with a ball mill. The resulting coating fluid was applied on the previously formed elastic layer by dipping to form a film 15 μm in thickness, followed by drying in an oven at 80° C. for 15 minutes. Further, hardening was carried out in an oven at 140° C. for 4 hours to form a resin layer of the outermost surface layer. Thus, a developing roller of Example 1 was obtained.

Example 2

A core bar covered with an elastic layer was prepared in the same manner as in Example 1.

A coating fluid for forming a resin layer was prepared as follows.

First, the following materials were mixed stepwise in a methyl ethyl ketone solvent and then allowed to react with each other at 80° C. for 3 hours under a nitrogen atmosphere. Consequently, a polyether polyol prepolymer (2) with a weight-average molecular weight Mw of 6,800 and a hydroxyl value of 43 was obtained.

Polytetramethylene glycol (trade name: PTG650SN, manufactured by Hodogaya Chemical Co., Ltd.): 100 parts by mass Trimethylol propane (manufactured by Mitsubishi Gas Chemical Company, INC): 3 parts by mass Isophorone diisocyanate (manufactured by Aldrich Co., Ltd.): 30 parts by mass Next, the following raw materials were mixed and methyl ethyl ketone was then added so as to be in a solid content of 28% by mass. The resulting product was used as a raw material liquid for the formation of a resin layer.

The above polyether polyol prepolymer (2) 100 parts by mass

Isocyante (trade name: C2521, manufactured by Nippon Polyurethane Industry Co., Ltd.): 152 parts by mass The above non-reactive silicone compound No. 2: 3 parts by mass To the solid content of the raw material liquid, 20 parts by mass of carbon black (trade name: KA100, manufactured by Mitsubishi Chemical Corporation) and 30 parts by weight of acrylic resin particles (trade name: MX-1000, manufactured by Soken Chemical & Engineering Co., Ltd.) were added, and stirred and dispersed with a ball mill, thereby obtaining a coating fluid for forming a resin layer.

The resulting coating fluid was applied on the elastic layer which covers the previously prepared core bar by dipping to form a film 15 μm in thickness, and was dried in an oven at 80° C. for 15 minutes. After that, hardening was carried out in an oven at 140° C. for 4 hours to form a resin layer of the outermost surface layer. Thus, a developing roller of Example 2 was obtained.

Example 3

A developing roller of Example 3 was produced in the same manner as in Example 2 except that the non-reactive silicone compound No. 2, which was used for preparing the coating fluid for forming the resin layer as the outermost layer, was replaced with the non-reactive silicone compound No. 3; and the mixing amount thereof was changed to 0.5 parts by mass.

Example 4

A developing roller of Example 4 was produced in the same manner as in Example 2 except that the non-reactive silicone compound No. 2, which was used for preparing the coating fluid for forming the resin layer as the outermost layer, was replaced with the non-reactive silicone compound No. 4.

Example 5

A developing roller of Example 5 was produced in the same manner as in Example 1 except that the non-reactive silicone compound No. 1, which was used for preparing the coating fluid for forming the resin layer as the outermost layer, was replaced with the non-reactive silicone compound No. 5; and the mixing amount thereof was changed to 10 parts by mass.

Example 6

A developing roller of Example 6 was produced in the same manner as in Example 1 except that the non-reactive silicone compound No. 1, which was used for preparing the coating fluid for forming the resin layer as the outermost layer, was replaced with the non-reactive silicone compound No. 6; and the mixing amount thereof was changed to 3 parts by mass.

Comparative Example 1

A developing roller of Comparative Example 1 was produced in the same manner as in Example 1 except that the non-reactive silicone compound No. 1 used to prepare the coating fluid for forming the resin layer of the outermost surface layer was not used.

Comparative Example 2

A developing roller of Comparative Example 2 was produced in the same manner as in Example 1 except that the non-reactive silicone compound No. 1, which was used for preparing the coating fluid for forming the resin layer as the outermost layer, was replaced with the non-reactive silicone compound No. 7; and the mixing amount thereof was changed to 3 parts by mass.

Comparative Example 3

A developing roller of Comparative Example 3 was produced in the same manner as in Example 1 except that the non-reactive silicone compound No. 1, which was used for preparing the coating fluid for forming the resin layer as the outermost layer, was replaced with the non-reactive silicone compound No. 8.

Comparative Example 4

A developing roller of Comparative Example 4 was produced in the same manner as in Example 2 except that the non-reactive silicone compound No. 2, which was used for preparing the raw material liquid for forming the resin layer as the outermost layer, was replaced with the non-reactive silicone compound No. 9

(Image Evaluation)

("Evaluation of Fogging" in a High Temperature and High Humidity Environment (Temperature of 30° C./Humidity of 85% RH))

Each of the developing rollers of the above Examples and the above Comparative Examples was set in an electrophotographic process cartridge for the under-mentioned color laser printer. Evaluation was made using the color laser printer (trade name: Color LaserJet 4700, manufactured by Hewlett-Packard Co., Ltd.).

As a developer, a cyan developer mounted on a cyan print cartridge of the Color Laser Jet 4700 was used.

In evaluation procedures, a 2% print image was printed on 15,000 sheets in a high temperature and high humidity environment. Thereafter, the color laser printer was left standing for 24 hours. Subsequently, a white solid image was output on a sheet of gloss paper (HP gloss paper) in a high temperature and high humidity environment. In this case, the reflection density of a white background area after printing was measured for each of 10 spots and the average thereof was defined as Ds(%), the reflection density of a white gloss paper before printing was measured for each of 10 spots and the average thereof was defined as Dr (%). In this case, the level of fogging was defined as Ds−Dr.

The reflection density was measured using a reflection density meter (trade name: REFLECTOMETER MODEL TC-6DS/A, manufactured by Tokyodenshoku, Co., Ltd.).

A case where the level of fogging is less than 0.5% is determined as an extremely excellent image.

A case where the level of fogging is 0.5% or more and less than 1.5% is determined as a good image having substantially no fogging.

A case where the level of fogging was 1.5% or more is determined as an unclear image having conspicuous fogging.

("Evaluation of Fogging" in a Normal Temperature and Normal Humidity Environment (Temperature of 23° C./Humidity of 55% RH))

The evaluation of "fogging" in a normal temperature and normal humidity environment was carried out in the same manner as in the "evaluation of fogging" in a high temperature and high humidity environment.

("Evaluation of Ghosts" in a Low Temperature and Low Humidity Environment (Temperature of 15° C./Humidity of 10% RH))

Each of the developing rollers of the above Examples and the above Comparative Examples was set in an electrophotographic process cartridge for the under-mentioned color laser printer. Evaluation was made using the color laser printer (trade name: Color LaserJet 4700, manufactured by Hewlett-Packard Co., Ltd.).

As a developer, a cyan developer mounted on a cyan print cartridge of the Color LaserJet 4700 was used as it was.

In evaluation procedures, after the color laser printer was left standing for 48 hours in a low temperature and low humidity environment, a ghost-determining image was output on a first sheet of paper and the image was then evaluated by visual observation. The ghost-determining image was obtained by printing a 60 h halftone image just after printing a 15 mm×15 mm square image. In this case, the density difference of the halftone image at one revolution of the developing roller after printing the 15 mm×15 mm square solid image was evaluated on the basis of the following criteria.

A: No difference in density is found.

B: An extremely slight difference in density is seen, but substantially no difference.

C: A slight difference in density is seen, but practically acceptable.

("Evaluation of Ghosts" in a Normal Temperature and Normal Humidity Environment (Temperature of 23° C./Humidity of 55% RH))

In the same manner as in the "Evaluation of ghosts" in a low temperature and low humidity environment, ghosts were evaluated in a normal temperature and normal humidity environment.

The evaluation results of the Examples and Comparative Examples are as shown in Table 1 below.

TABLE 1

| | Non-reactive silicone compound | | | Evaluation of fogging | | Evaluation of ghosts | |
|---|---|---|---|---|---|---|---|
| | No. | Specific gravity | Solubility in water | High temperature and high humidity | Normal temperature and normal humidity | Low temperature and low humidity | Normal temperature and normal humidity |
| Example 1 | 1 | 1.02 | Less than 0.1% | 0.13 | 0.11 | A | A |
| Example 2 | 2 | 1.03 | Less than 0.1% | 0.22 | 0.15 | A | A |
| Example 3 | 3 | 1.03 | Less than 0.1% | 0.34 | 0.14 | A | A |
| Example 4 | 4 | 1.01 | Less than 0.1% | 0.4 | 0.16 | A | A |
| Example 5 | 5 | 0.99 | Less than 0.1% | 0.23 | 0.15 | A | A |
| Example 6 | 6 | 1 | Less than 0.1% | 0.49 | 0.2 | B | A |

TABLE 1-continued

| | Non-reactive silicone compound | | | Evaluation of fogging | | Evaluation of ghosts | |
|---|---|---|---|---|---|---|---|
| | No. | Specific gravity | Solubility in water | High temperature and high humidity | Normal temperature and normal humidity | Low temperature and low humidity | Normal temperature and normal humidity |
| Comparative Example 1 | — | — | — | 1.03 | 0.34 | C | A |
| Comparative Example 2 | 7 | 1.05 | 0.1% or more | 1.24 | 0.32 | C | A |
| Comparative Example 3 | 8 | 0.96 | Less than 0.1% | 1.09 | 0.32 | C | A |
| Comparative Example 4 | 9 | 0.98 | Less than 0.1% | 1.14 | 0.33 | B | A |

As shown Table 1 above, in Examples 1 to 6, high-quality images could be obtained by simultaneously overcoming fogging in a high temperature and high humidity environment and ghosts in a low temperature and low humidity environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-269657, filed Sep. 29, 2006, and No. 2007-199230, filed Jul. 31, 2007, which are hereby incorporated by reference herein in their entirety.

What is claimed is:

1. A developing member which comprises a mandrel and a resin layer formed on the periphery of the mandrel, and has an outermost surface layer containing a non-reactive silicone compound, wherein the non-reactive silicone compound satisfies the following requirements (A) to (C):

(A) a copolymer of silicone and polyoxyethylene;

(B) a specific gravity (25° C.) d of $0.99 \leqq d \leqq 1.03$; and (C) a solubility in water (25° C.) of less than 0.1% by mass.

2. A developing member according to claim 1, wherein the resin layer has at least two layers.

3. A developing member according to claim 1, wherein the non-reactive silicone compound has a weight-average molecular weight (Mw) of $6{,}000 \leqq Mw \leqq 11{,}000$.

4. A developing member according to claim 1, wherein the non-reactive silicone compound has a structure represented by formula (1):

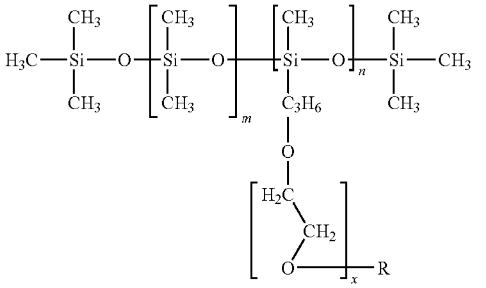

(1)

where m, n and x are each independently an integer of 1 or more; and R represents an alkyl group.

5. A developing member according to claim 1, wherein the resin layer contains polyether urethane obtained by reaction of polyether polyol with isocyanate.

6. A developing member according to claim 5, wherein the non-reactive silicone compound has a weight-average molecular weight (Mw) which satisfies $Mw<N$ where a weight average molecular weight of the polyether polyol is defined as N.

7. An electrophotographic image forming apparatus, comprising:

an image carrier for carrying an electrostatic latent image;

a charging device for primarily charging the image carrier;

an exposure device for forming an electrostatic latent image on the primarily charged image carrier;

a development device for developing the electrostatic latent image to form a toner image; and a transfer device for transferring the toner image to a transfer material, wherein the development device includes the developing member according to claim 1.

* * * * *